(12) United States Patent
Schkolnik

(10) Patent No.: US 7,271,797 B2
(45) Date of Patent: Sep. 18, 2007

(54) OPTICAL WINDOW FOR GENERATING A WAVEFORMS

(75) Inventor: Daniel G. Schkolnik, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/000,422

(22) Filed: Oct. 31, 2001

(65) Prior Publication Data
US 2003/0080941 A1   May 1, 2003

(51) Int. Cl.
*G09G 5/08* (2006.01)
(52) U.S. Cl. ............... 345/163; 345/164; 345/165; 345/166; 341/31
(58) Field of Classification Search ......... 345/156, 345/163–167; 463/37; D14/402
See application file for complete search history.

(56) References Cited

U.S. PATENT DOCUMENTS 4,906,843 A * 3/1990 Jones et al. .......... 250/221
6,111,563 A   8/2000 Hines

FOREIGN PATENT DOCUMENTS

FR   1.159.726   7/1958

* cited by examiner

*Primary Examiner*—Duc Q. Dinh
(74) *Attorney, Agent, or Firm*—Marger Johnson & McCollum, P.C.

(57) ABSTRACT

An optical window is disclosed through which light can be shone to generate a waveform. Windows are hourglass-shaped, to better conform the shape of the windows to the distribution of light intensity. The optical window can be incorporated into a variety of optical devices.

18 Claims, 4 Drawing Sheets

OPTICAL WINDOW FOR GENERATING A WAVEFORMS

BACKGROUND OF THE INVENTION

The present disclosure is related to the field of optical devices, and more specifically to a wheel for use in generating a waveform.

Devices, such as computer mice, use opto-mechanical schemes to generate electrical waveforms which correspond to the movement of some element of the system. Other devices utilizing optics to generate a waveform are known in the automotive and manufacturing fields. Applications in these fields correlate wheel rotation to movement, e.g., rotation of an engine shaft.

In a mouse, for example, light emitted from a light source is detected by a detector. A stroboscopic wheel is interposed therebetween, such that the light passes through windows in the wheel.

The wheel is driven by mechanical contact with the mouse ball, and the pulses of light received by the receptor can be correlated with the speed of the ball, a reflection of the speed of the mouse itself. These pulses can then be integrated with respect to time to establish displacement of the mouse.

Ideally, a waveform corresponding to mouse displacement would be a perfect square wave. In such a perfect wave, voltage would rise instantaneously, dwell at maximum voltage for a finite period of time, then fall instantaneously to a minimum voltage where it would remain for a finite time before starting the process anew. In actual devices, waveforms are imperfect and are, at best, approximately sinusoidal. Considerable electronic circuitry is expended in filtering out noise and "squaring up" the signal so that it contains a sharp, readily discernable rising and falling edge.

The present invention addresses this and other problems associated with the prior art. The invention will become more readily apparent from the following Detailed Description, which proceeds with reference to the drawings.

DETAILED DESCRIPTION OF EMBODIMENTS

Figure 1:
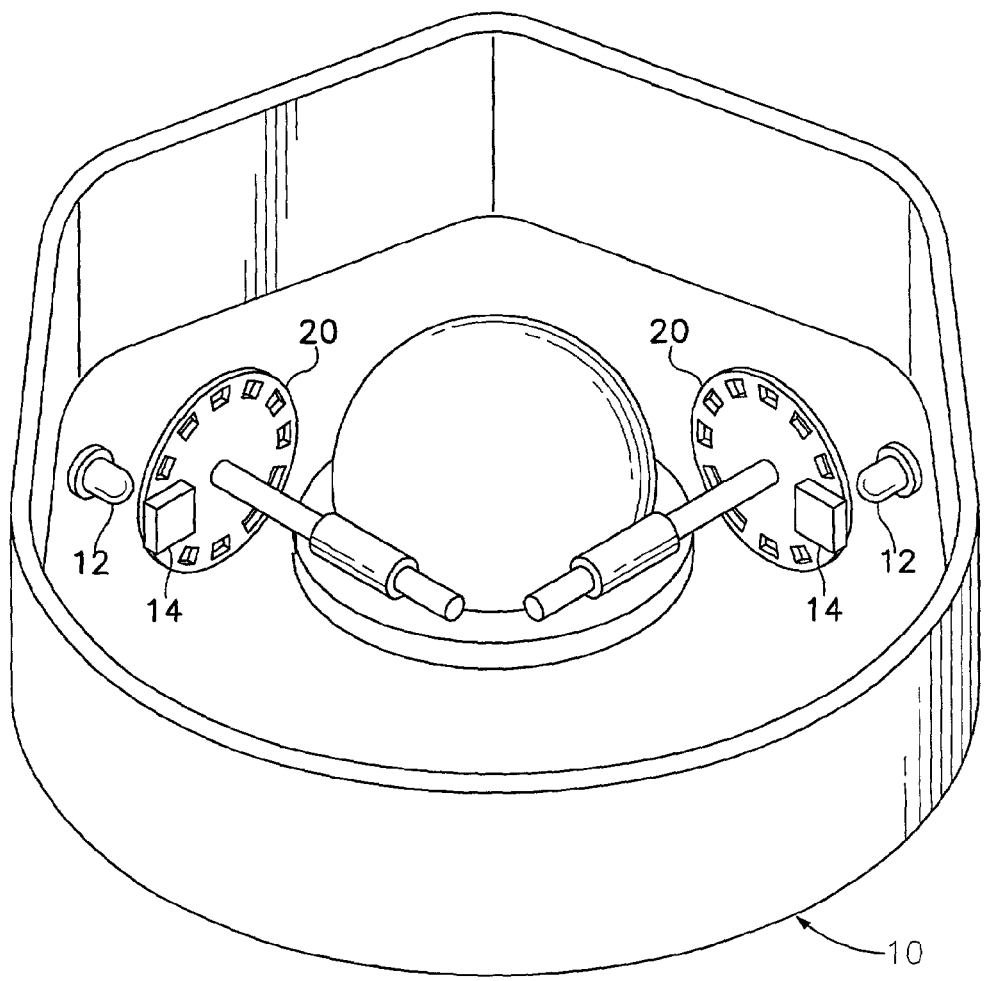
FIG. 1 is a perspective view of a portion of the internal components of a prior art optical mouse pointing device.

FIG. 1 shows a typical optical wheel in an optical mouse 10 of the prior art. Such devices typically include a light source 12 and a detector 14. In conventional optical devices, e.g., an optical computer mouse (FIG. 2), the light source and detector define a light path, the light passing through apertures 22 in an optical wheel 20, the latter operating under a stroboscopic principle.

Figure 3:
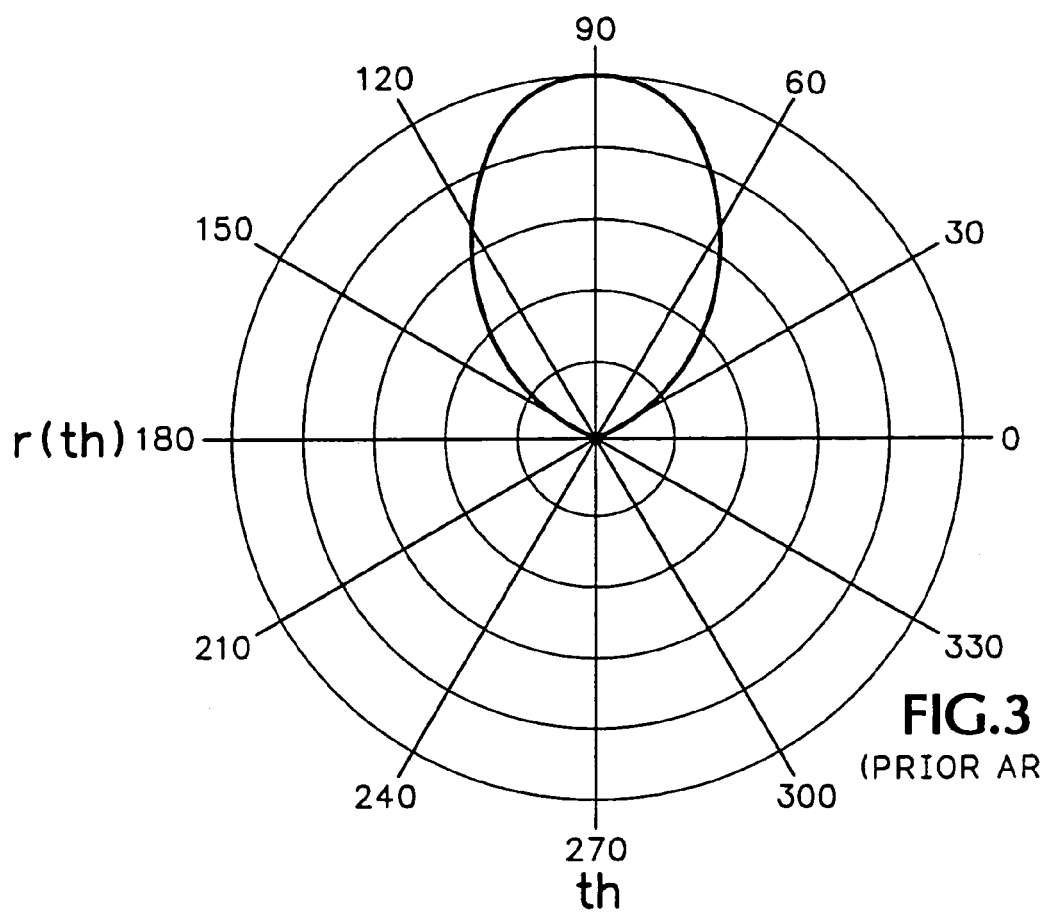
FIG. 3 is a is a polar plot of light intensity incident upon a detector in an optical device of the prior art.

The intensity of light from an LED or other light source is not uniform when measured at a constant distance from the light source. FIG. 3 is a qualitative polar plot of the intensity of light striking a detector in a conventional device. Peak intensity occurs along the optical axis of the device (90°) and falls off by the time one moves to plus or minus 90° from the optical axis, where the intensity is virtually zero.

Figure 2:
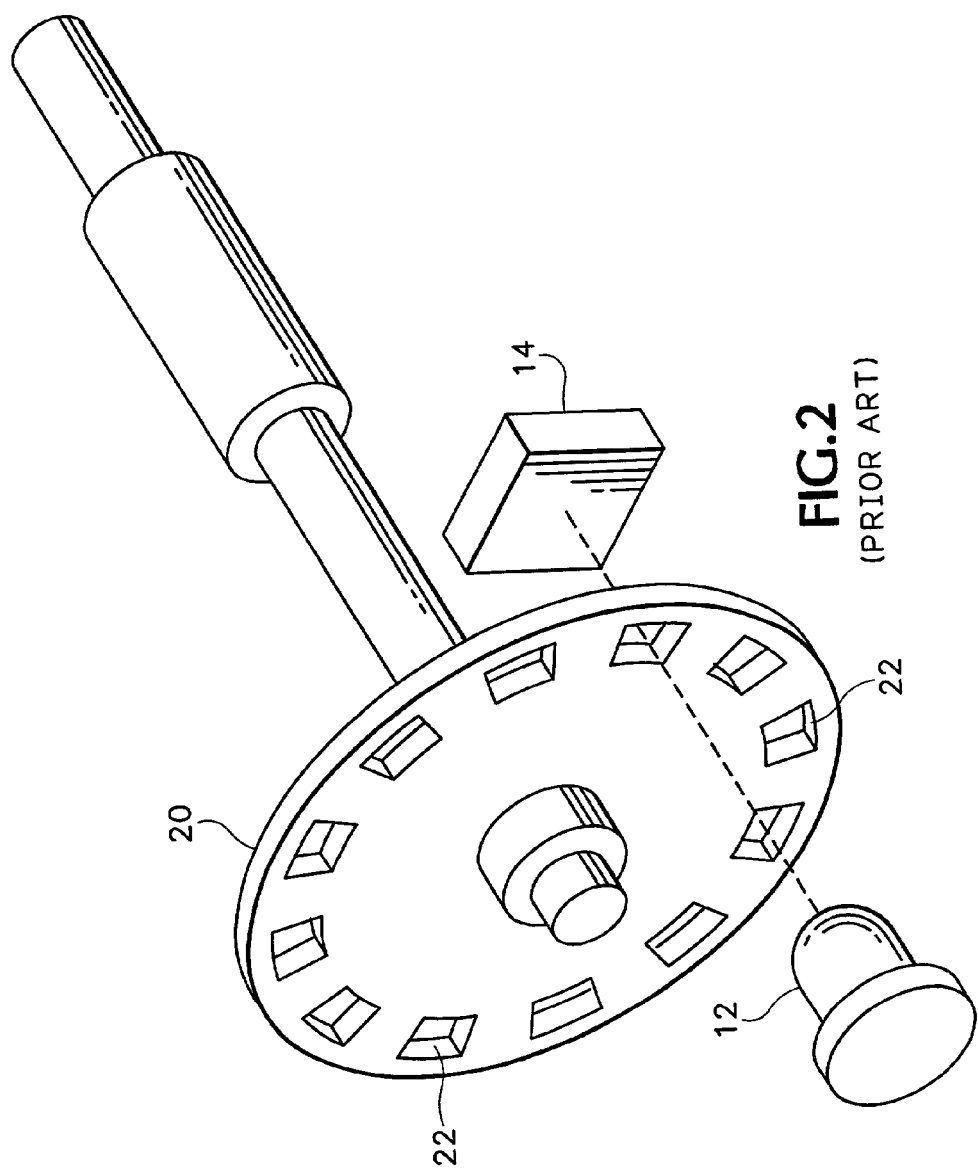
FIG. 2 is an enlarged perspective view of a subset of the internal components of FIG. 1.

In the computer mouse example, this non-uniform light then passes through straight-sided apertures 22 in the signal-generating wheel 20 (FIG. 2). The resultant waveform does not present a square shape, thereby introducing inaccuracy into the device and necessitating additional processing to correct for the waveform imperfection.

Figure 4:
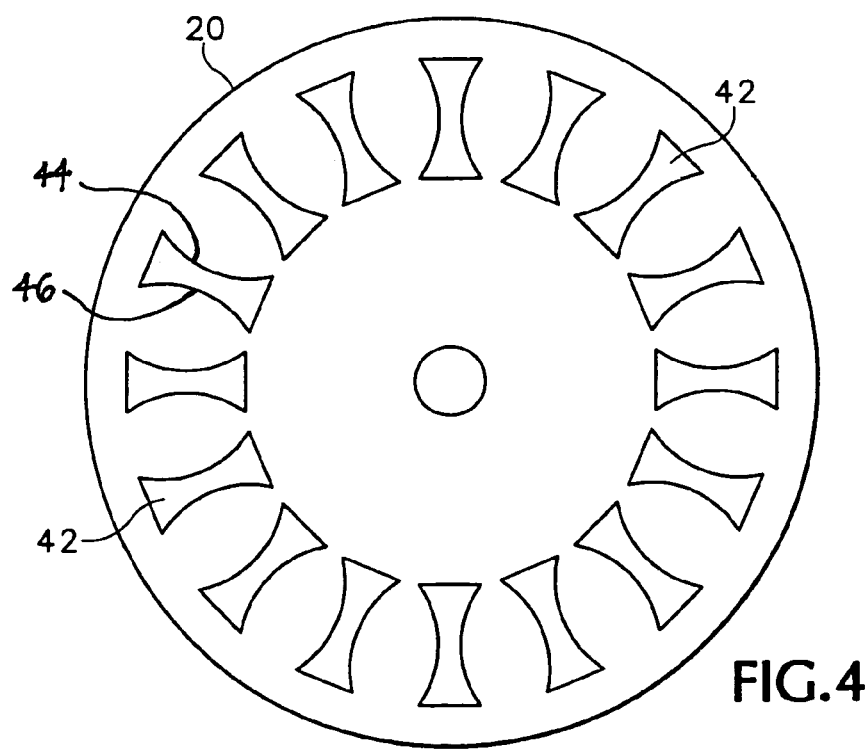
FIG. 4 is a side view of an optical wheel having optical windows constructed according to the present disclosure.
Figure 5:
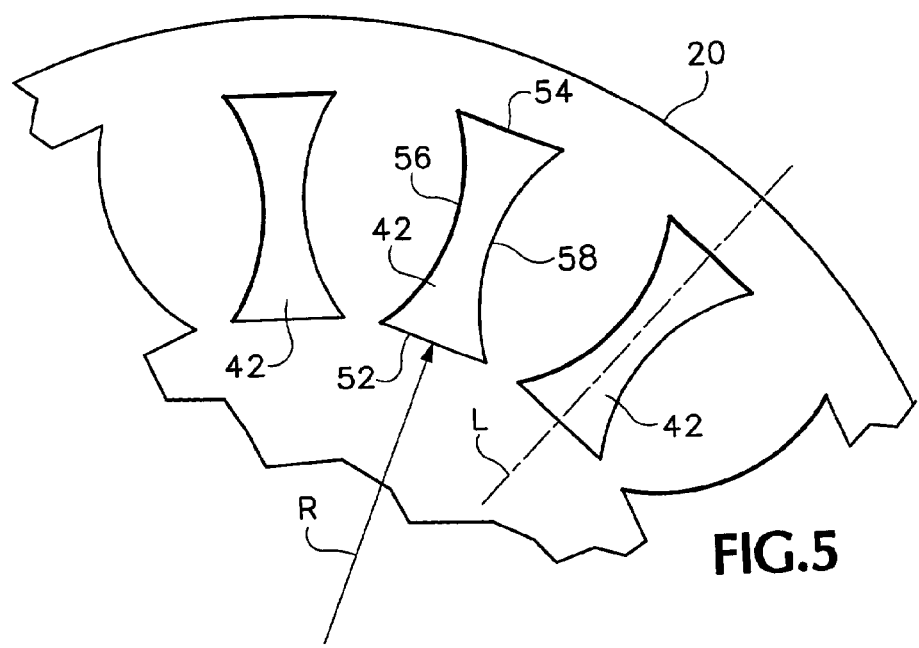
FIG. 5 is an enlarged side view of a portion of the wheel of FIG. 4, showing in detail one of the plurality of optical windows.

A wheel comprising optical windows according to the present disclosure is shown in FIGS. 4 and 5. The optical windows 42 are hourglass-shaped, in that two opposing sides 44,46 are disposed so that the ends of the opposed sides are spaced farther apart than their centers. In one embodiment, the opposing sides can describe hyperbolic curves, whose function is dependent upon factors including the geometry and total area of the window, the pathlength of the light, and the orientation of the wheel along the light path.

Where the intensity of the emitted light is brightest, the "lens opening" (window 42) is smallest and vice versa. In other words, the optical axis of the LED would be at the same height as the narrowest part of the window, as would the photodetector's centerline. Thus, the shape of the window disclosed herein more closely matches the distribution of light intensity for the corresponding LED. As such, a truer signal is generated, i.e., the waveform has a more ideal shape.

Because the waveform shape is more accurate, less processing is required to translate the waveform into movement data. Bill of materials cost and power consumption are also reduced, as the cost of molding an hour-glass shaped hole is not significantly discernable from the cost of molding a straight-sided hole in, for example, a plastic wheel.

In the embodiment shown in FIG. 5, the optical windows 42 are shown as generally rectangular, with their long axes L congruent with radius R of the wheel 20.

The shape of each window may be described as being defined by a base 52, a top 54, and first and second sides 56,58. The top and base are opposed, and the first side and second side are also opposed. The first and second (i.e., long) sides 56,58 of the windows of FIG. 5 are inwardly curved to present a more homogeneous light to the detector.

Figure 6:
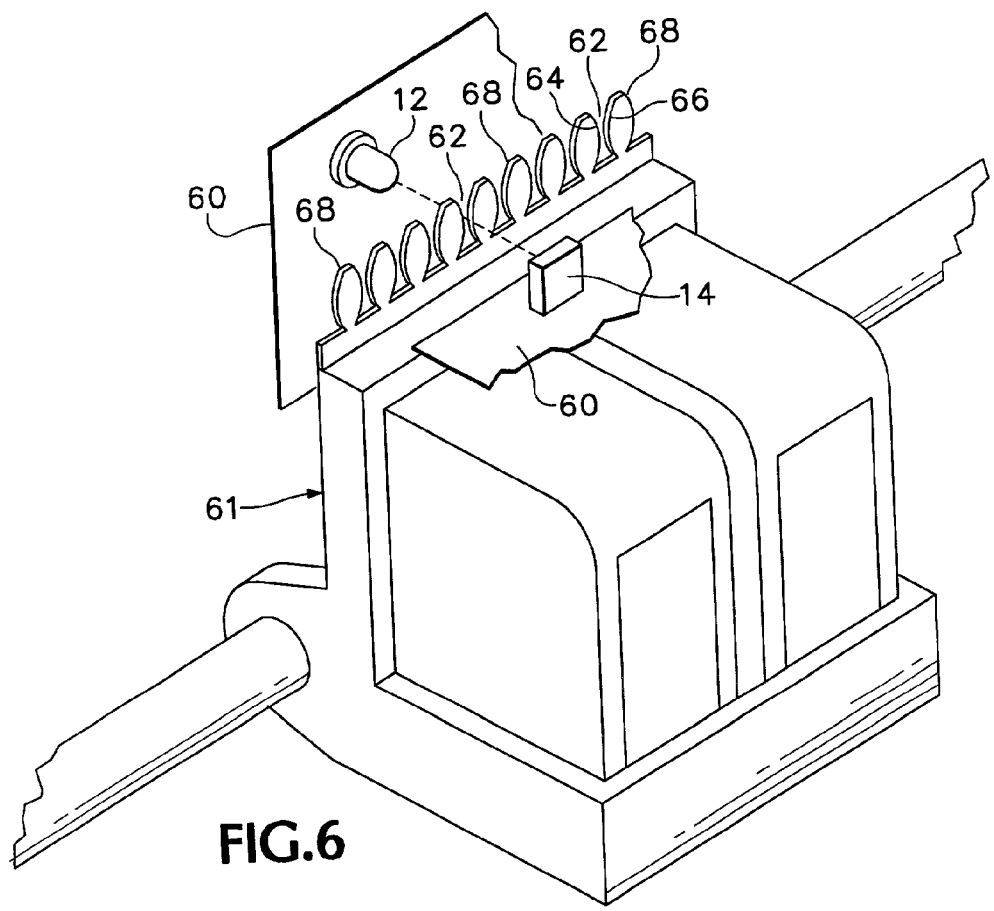
FIG. 6 is a side view of an alternative optical device incorporating optical windows in accordance with the present disclosure.

In an alternative embodiment, the optical windows can be linearly distributed. For example, windows according to the present disclosure can be disposed on a printer carriage (FIG. 6). In one form of this embodiment, the light source 12 and detector 14 can be coupled to the printer body 60, and the improved optical windows 62 can be linearly distributed along the printer carriage 61. In this form, the light source and detector remain stationary while the windows are passed through the light path.

In a similar embodiment, the light source 12 and detector 14 can ride with a printer carriage 61. Here, the windows 62 are intended to remain stationary with the printer body 60, and the light source-detector pair 12,14 is adapted to be mobile contemporaneous with the printer carriage 61. When the light source and detector move, the light path is then passed through the linearly distributed windows on the printer body.

"Windows" in the present disclosure is meant to encompass light-passing apertures, whether such apertures are voids in a solid object or windows of a transparent material. For example, a light-transparent disc or strip can be etched or otherwise frosted to render it opaque to light except for the windows. Such a disc or strip can be manufactured of material that is transparent to light of a defined wavelength but opaque to other wavelengths. The optical part thus produced would possess the benefits of the present windows and would not be transparent to light of wavelengths other than that employed in the device.

In the same vein, the present windows can be cut-outs in the edge of an optical wheel or strip (FIG. 6). A representative optical part so constructed has a toothed or gear-like edge, wherein each window 62 is defined by the sides 64,66 of adjacent teeth 68, that is, the gaps between teeth would correspond structurally to the optical windows. In this embodiment, the teeth would have a pair of crenate (i.e., outwardly-curved) sides, such that the window 62 was hourglass-shaped.

As discussed, a wheel according to the present disclosure can be employed in a computer mouse. There are other industries which can employ similar source/wheel/detector arrangements for signal generating. For example, devices operating under the same principle herein discussed can be used to detect both fine and course speeds in diesel engines and fuel pumps. Such fields possess general signal generating/detecting requirements to which the optical window shaped according to the present disclosure would be suitably and beneficially applied.

A person skilled in the art will be able to practice the present invention in view of the description present in this document, which is to be taken as a whole. The specific embodiments herein disclosed and illustrated are not to be considered in a limiting sense. Indeed, it should be readily apparent to those skilled in the art in view of the present description that the invention can be modified in numerous ways. The inventor regards the subject matter of the invention to include all combinations and sub-combinations of the various elements, features, functions and/or properties disclosed herein.

The invention claimed is:

1. An improved optical wheel comprising a circular disc having a plurality of windows arranged adjacent a periphery of the disc, the improvement comprising each of the plurality of windows being characterized by a substantially hourglass shape such that a variation in width of each window is more closely correlated to a light intensity distribution of an associated light source resulting in a more accurate output signal.

2. The optical wheel of claim 1, each window comprising a first pair of opposed sides disposed so that both ends of the first pair of opposed sides are spaced farther apart than centers of the first pair of opposed sides.

3. The optical wheel of claim 1, wherein the first pair of opposed sides of the window describe hyperbolic curves.

4. The optical wheel of claim 1, wherein each of the plurality of windows is transparent to light of a defined wavelength.

5. The optical wheel of claim 1, wherein each of the plurality of windows is elongated to define a long axis, said long axis being substantially congruent with a radius of the disc.

6. An optical device, comprising:
a light source having a non-uniform intensity versus angular deviation from an axis;
a detector;
a light path defined between the light source and the detector;
a stroboscopic element; and
a plurality of substantially hourglass-shaped windows arranged on the stroboscopic element and operative to be interposed in the light path;
wherein each hourglass-shaped window is shaped such that a variation in width of the window is more closely correlated to a light intensity distribution of the light source resulting in a more accurate output signal.

7. The optical device of claim 6, each window comprising a first pair of opposed sides disposed so that the ends of the first pair of opposed sides are spaced farther apart than the centers of the first pair of opposed sides.

8. The optical device of claim 6, wherein the first pair of opposed sides describe hyperbolic curves.

9. The optical wheel of claim 6, wherein each of the plurality of windows is transparent to light of a defined wavelength.

10. The optical device of claim 6, wherein each window is elongated to define a long axis, said long axis being substantially congruent with a radius of the wheel.

11. An optical wheel, comprising:
a circular disc having a periphery;
a plurality of windows arranged adjacent the periphery of the disc, each of the plurality of windows comprising:
a top and a base defining a height; and
a first side and a second side defining a width;
wherein each of the plurality of windows is characterized by a substantially hourglass shape such that a variation in width of the window is more closely correlated to a light intensity distribution of the light source resulting in a more accurate output signal.

12. The optical wheel of claim 11, wherein the first side and the second side are disposed so that ends of the first side and the second side are spaced farther apart than centers of the first side and the second side.

13. The optical wheel of claim 12, wherein the first side and the second side of the window describe hyperbolic curves.

14. The optical wheel of claim 13, wherein each of the plurality of windows is transparent to light of a defined wavelength.

15. The optical wheel of claim 11, wherein each of the plurality of windows is elongated to define a long axis, said long axis being substantially congruent with a radius of the disc.

16. An optical device, comprising:
a light source configured to emit light;
a light path defined by an axis intersecting the light source along which an intensity of the light is substantially a maximum;
a detector disposed in the light path; and
an optical element between the light source and the detector, the optical element including:
a plurality of optical windows, each optical window having:
a first side;
a second side disposed opposite the first side, the first and second sides shaped such that points on the first side and points on the second side are disposed at varying distances;
a minimum distance line defined by a point on the first side and a point on the second side having a substantially minimum distance between each other; and
a third side coupling an end of the first side to an end of the second side;
wherein, when the light path intersects one of the optical windows, the minimum distance line of the optical window substantially intersects the light path resulting in a more accurate output signal.

17. The optical device of claim 16, wherein:
an intensity of the light source varies according to angular deviation from the axis;
the first and second sides of each optical window are shaped such that a distance between the first and second sides varies inversely to angular deviation from the axis along a centerline of the optical window when the light path intersects the centerline of the optical; and the centerline of each optical window is disposed between the first side and the second side of the optical window.

18. The optical device of claim 16, wherein:

the first and second sides of each optical window are shaped such that when the optical element moves relative to the light path, a light intensity measured at the detector versus a position of the optical element has a shape substantially between a sinusoid and a square wave.

\* \* \* \* \*